(12) United States Patent
Kern et al.

(10) Patent No.: US 9,268,402 B2
(45) Date of Patent: Feb. 23, 2016

(54) OPERATOR CONTROL DEVICE

(75) Inventors: Alexander Thorsten Kern, Alsbach (DE); Ingo Zoller, Hoesbach (DE)

(73) Assignee: Continental Automotive GmbH, Hannover (DE)

(*) Notice: Subject to any disclaimer, the term of this patent is extended or adjusted under 35 U.S.C. 154(b) by 59 days.

(21) Appl. No.: 14/239,008

(22) PCT Filed: Aug. 1, 2012

(86) PCT No.: PCT/EP2012/065039
§ 371 (c)(1),
(2), (4) Date: Feb. 14, 2014

(87) PCT Pub. No.: WO2013/023922
PCT Pub. Date: Feb. 21, 2013

(65) Prior Publication Data
US 2014/0197938 A1    Jul. 17, 2014

(30) Foreign Application Priority Data
Aug. 17, 2011    (DE) .......................... 10 2011 111 543

(51) Int. Cl.
| G08B 6/00 | (2006.01) |
| G06F 3/01 | (2006.01) |
| G06F 3/0354 | (2013.01) |

(52) U.S. Cl.
CPC ............ *G06F 3/016* (2013.01); *G06F 3/03547* (2013.01)

(58) Field of Classification Search
CPC ..... G06F 3/016; G06F 3/041; G06F 3/03547; H01F 2007/068; H01F 5/003; H02K 33/02; H02K 7/09; F16C 32/0476; F16C 32/0442; F16C 32/0459; F16C 32/0446; F16C 35/00; F16C 37/005; F16C 39/02
USPC ............ 340/407.2, 815.51, 446, 539.21, 566, 340/582, 683, 407.1
See application file for complete search history.

(56) References Cited

U.S. PATENT DOCUMENTS

| 5,574,616 | A * | 11/1996 | Becker et al. | 361/149 |
| 5,742,921 | A * | 4/1998 | Oo et al. | 701/102 |
| 5,781,005 | A * | 7/1998 | Vig et al. | 324/207.2 |
| 5,931,320 | A * | 8/1999 | Gajda et al. | 211/193 |
| 6,043,646 | A * | 3/2000 | Jansseune | 324/207.26 |
| 2007/0135735 | A1 * | 6/2007 | Ellis et al. | 600/587 |

* cited by examiner

*Primary Examiner* — Daniel Previl
(74) *Attorney, Agent, or Firm* — Cozen O'Connor

(57) ABSTRACT

An operator control device has an operating element with haptic feedback. The operating element has a touch-sensitive operator control area and is operated through an input element. The device includes a first and a stationary second flat component that are composed of a ferromagnetic material and arranged to face each other in parallel by way of their large areas. The operator control device also includes a coil or an electrical conductor that is arranged between the first and second flat components and associated with a first pole shoe that is connected to the second flat component and projects in relation to the first flat component. A magnetic field can be generated by applying current to the coil or to the conductor, and the first flat component is driven by the magnetic field such that the first flat component can be displaced horizontally with respect to the stationary second flat component.

13 Claims, 8 Drawing Sheets

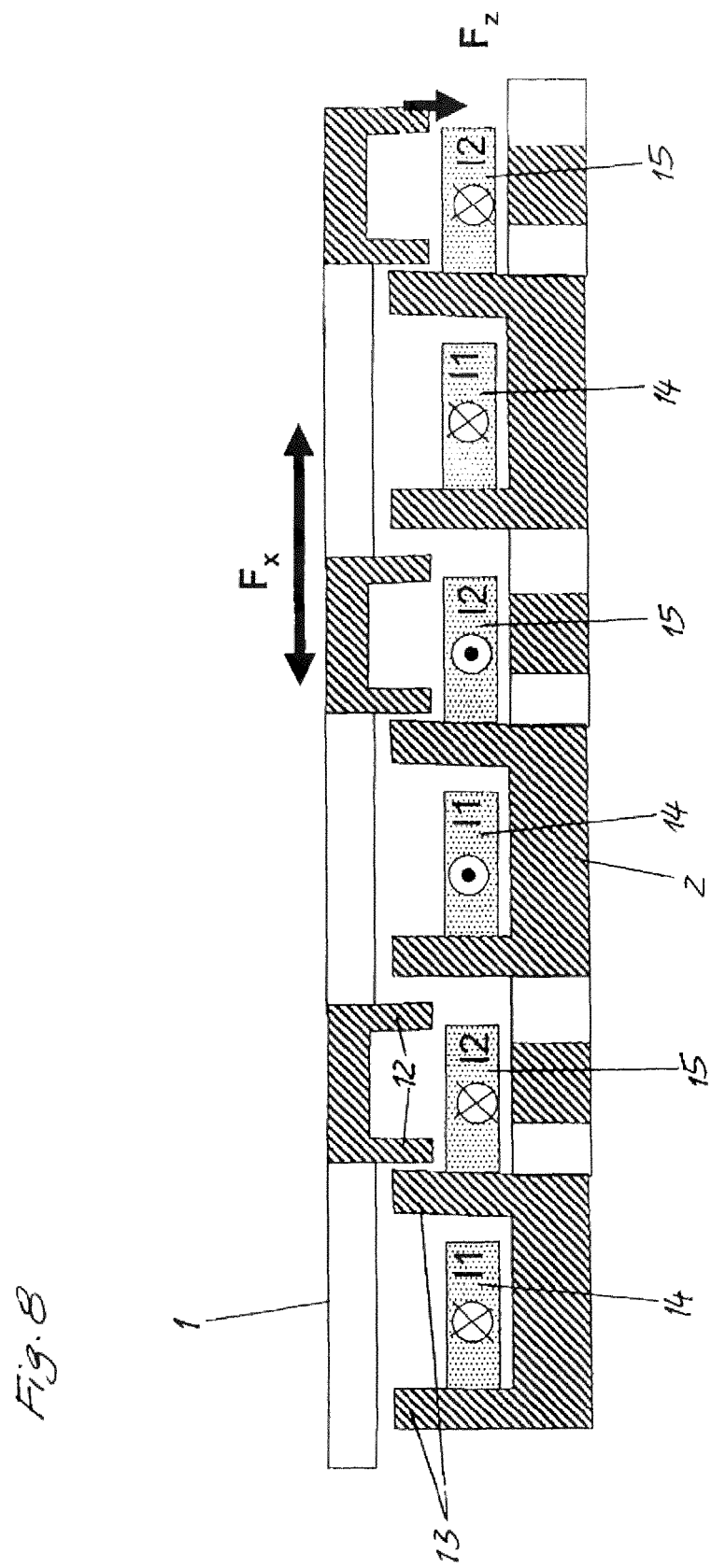

OPERATOR CONTROL DEVICE

CROSS-REFERENCE TO RELATED APPLICATIONS

Figure 1:
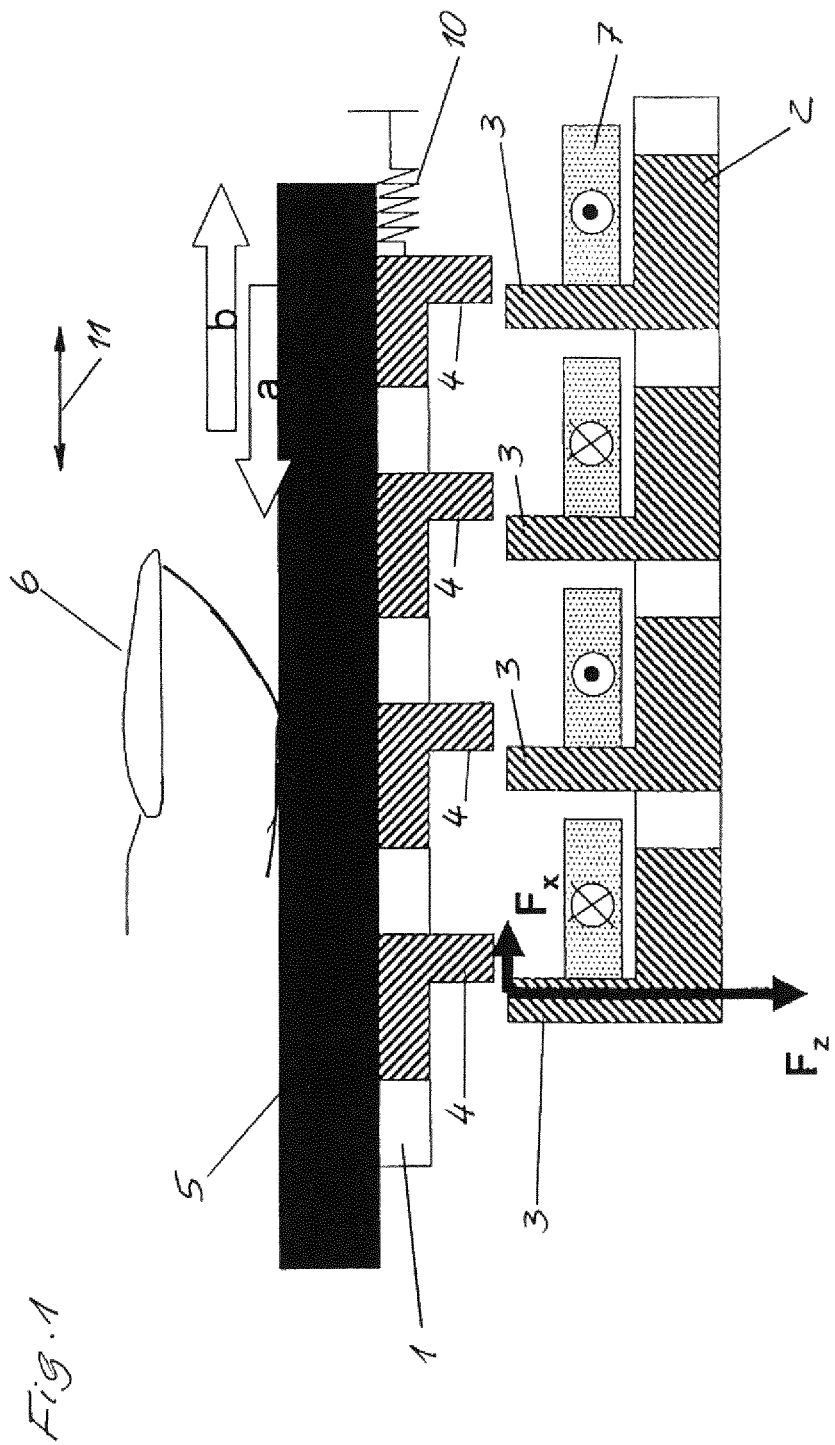

This is a U.S. national stage of PCT Application No. PCT/EP2012/065039, filed on 1 Aug. 2012, which claims priority to German Patent Application No. 10 2011 111 543.2, filed on 17 Aug. 2011, each of which is hereby incorporated in its entirety by reference.

FIELD OF THE INVENTION

The invention relates to an operator control device having an operating element with haptic feedback. The operating element has a touch-sensitive operator control area, wherein the operating element can be operated by an operator by means of an input element. The operator control device has first and second flat components which are composed of a ferromagnetic material and are oriented parallel to each other by way of their large areas. The first flat component can be driven such that it can be displaced in a manner guided horizontally relative to the stationary second flat component, wherein the first flat component forms the operator control element or transmits its movement entirely or partially to the operator control element. The operator control device also has a coil or an electrical conductor that is arranged between the flat components and is associated with a first pole shoe, which is connected to the second flat component and projects in relation to the first flat component, wherein a magnetic field can be generated by applying current to the coil or to the conductor; It is possible for the first flat component to be driven by said magnetic field such that it can be displaced horizontally relative to the second flat component from an inoperative position to a displacement position.

DESCRIPTION OF THE RELATED ART

Haptic feedback from operator control elements is required above all when an operator cannot directly perceive the operator control process which he is carrying out. While an operator can perceive the opening or closing of the switching contacts by changing haptics of the operator control element in the case of operator control devices with electromechanical switches, this is not necessarily the case with electronic switches. For this reason, the prior art discloses operator control elements which provide haptic feedback about an operator control process which has taken place by movements of the operator control element which are perceptible to the operator. The known haptic operator control elements (e.g., touchscreens) require a large installation space, a complex drive and special structural measures. This is so especially if they are to be used, for example, in environments which are characterized by particularly large differences in temperature, such as in a motor vehicle that has to remain operationally capable both in Arctic cold as well as in summer heat, for example.

SUMMARY OF THE INVENTION

An object of the invention is to provide an operator control device of the kind described in the introductory part which has a low overall height and a simple design.

According to the invention, this object is achieved in that the first flat component is connected to a second pole shoe, which projects in relation to the second flat component and, in the inoperative position of the first flat component, is laterally offset in relation to the first pole shoe in the direction of extent of the flat components.

A magnetic field is generated when current is applied to the coil or to the conductor, wherein the magnetic flux flows across the first pole shoe to the second pole shoe and, as a result, the magnetic flux acts on the second pole shoe with a force component by means of which the second pole shoe by the first pole shoe and, as a result, the horizontal offset of the first and the second pole shoes is minimized. The pole shoes do not make contact in this case.

The horizontal movement component leads to the excitation of the sensory organs of the operator. Since the operator perceives essentially the amplitude of the excitation, but not the direction, in the case of small excitations, the movement of the first flat component can also be a movement impression which is perceived perpendicular to the direction of excitation.

The design according to the invention provides a drive of flat construction which is made up of simple components.

The flat components with the pole shoes can be formed in a simple manner as stamped-and-bent parts which are composed of sheet metal.

As an alternative or in addition to the coil which is associated with the first pole shoe or to the conductor, a second coil and/or a second electrical conductor can be associated with the second pole shoe.

A plurality of first pole shoes is preferably connected to the second flat component. An electrical conductor and corresponding second pole shoes, which are connected to the first flat component, are associated with each of the plurality of first pole shoes.

There can be an axial distance between the free end of the first pole shoe and the free end of the second pole shoe. In this case, the end faces of the first and of the second pole shoes, which end faces face each other, do not overlap or overlap by way of less than half their extent in the direction of movement of the first flat component in the inoperative position of the first flat component, and overlap to a greater extent in the displacement position of the first flat component than in the inoperative position.

If there are only a first and a second pole shoes, it is advantageous, for the purpose of uniform application of force, when the first pole shoe extends away from the second flat component centrally with respect to the length in the direction of movement of the first flat component and/or the second pole shoe extends away from the first flat component centrally with respect to the length in the direction of movement of the first flat component.

Another possibility is that the first pole shoe projects by such an extent in relation to the first flat component and the second pole shoe projects by such an extent in relation to the second flat component that the free end regions of the first pole shoe and of the second pole shoe are situated opposite to each other and at a distance in the direction of movement of the first flat component.

Good magnetic flux between the two pole shoes is produced when the end faces of the pole shoes, which end faces are situated opposite to each other, extend parallel in relation to one another.

The end faces of the pole shoes, which end faces are situated opposite to each other, can either extend parallel to the planes of the first and the second flat components or, in order to reduce the overall height, extend in an inclined manner in relation to the planes of the first and the second flat components, wherein the end faces of the pole shoes, which end faces are situated opposite to each other, are preferably inclined in the direction of movement of the first flat component.

In order to return the first flat component from the displacement position to the inoperative position after current has been applied to the coil or to the conductor, the first flat component can be driven in a simple manner such that it can be displaced horizontally relative to the second flat component from the inoperative position to the displacement position against a spring force.

Another possible way of driving the movement of the first flat component in the two directions of movement is that a pair of first pole shoes is arranged at a distance from one another in the direction of movement of the first flat component, a second pole shoe or a pair of second pole shoes projecting between said first pole shoes, wherein the second pole shoe or the pair of second pole shoes is arranged between the pair of first pole shoes such that it can be moved between the inoperative position and the displacement position, and wherein current can be applied alternately to the coils or electrical conductors which are associated with the pole shoes of the first pair of pole shoes. The coil can surround the first pole shoe.

In another highly effective design of simple construction, the first and the second pole shoes can extend transverse to the direction of movement of the first flat component, and the electrical conductor can be guided along the longitudinal extent of the first pole shoe.

In this case, a plurality of first pole shoes are designed in the manner of a comb with a connecting element which extends in the direction of movement of the first flat component and connects the one ends of the first pole shoes to one another, and the electrical conductor extends in a meandering manner through the interspaces between the first pole shoes, and a corresponding number of second pole shoes can be associated with the first pole shoes, said second pole shoes being designed in the manner of a comb with a connecting element which extends in the direction of movement of the flat component and connects the one ends of the second pole shoes to one another.

BRIEF DESCRIPTION OF THE PREFERRED EMBODIMENTS

Figure 2:
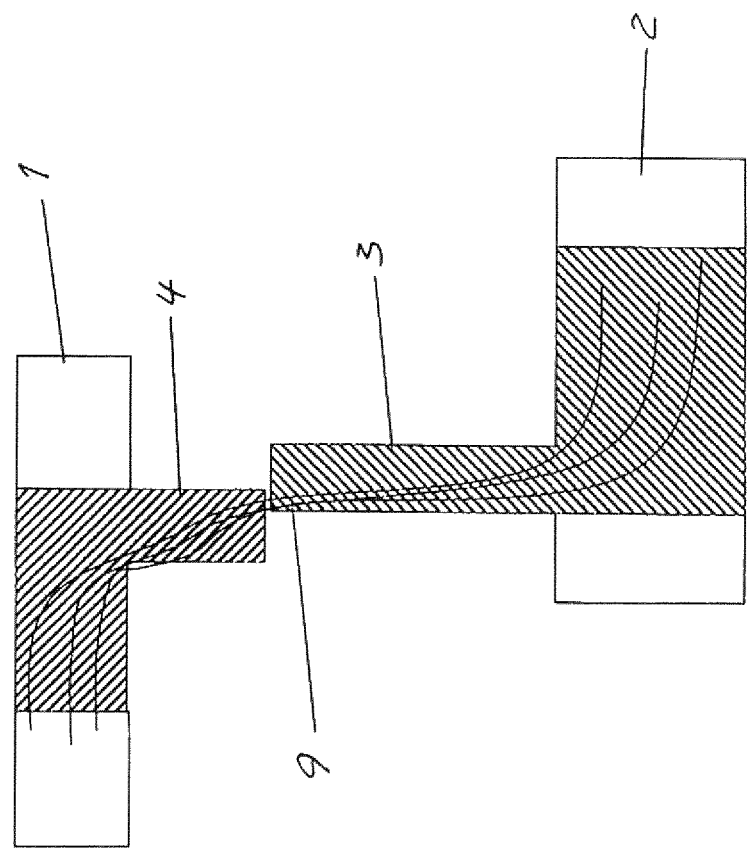
Figure 3:
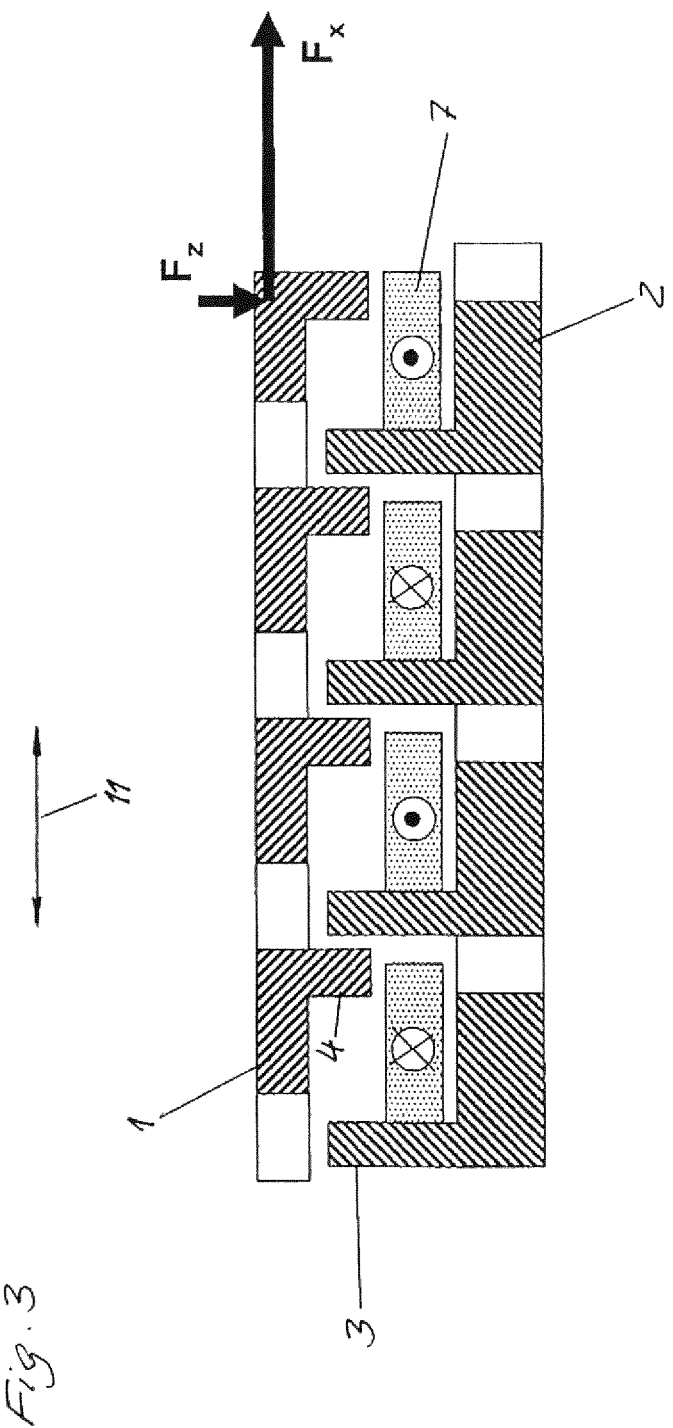
Figure 4:
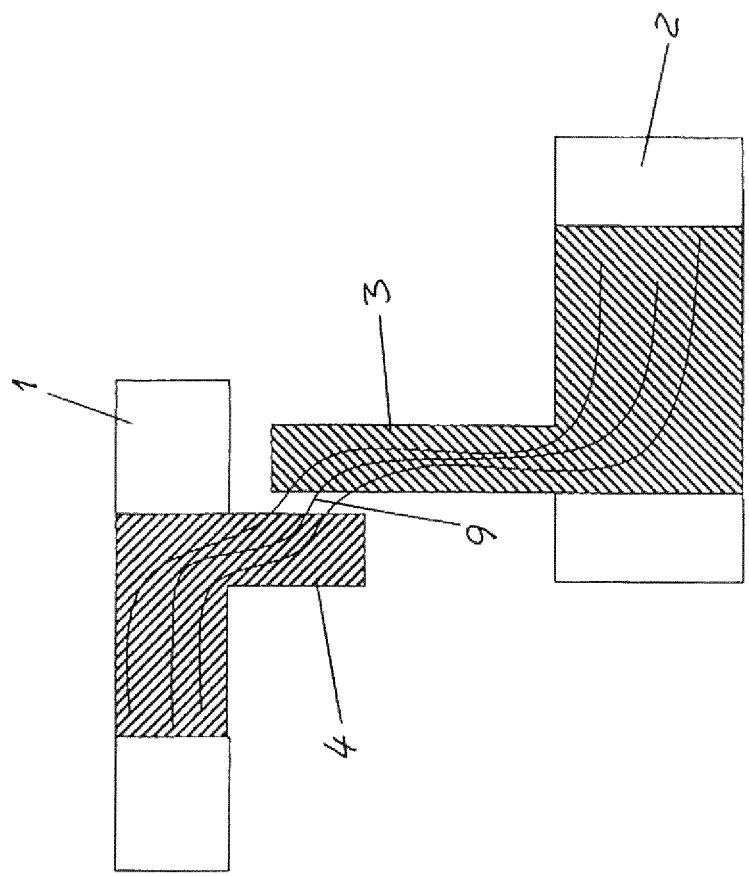
Figure 5:
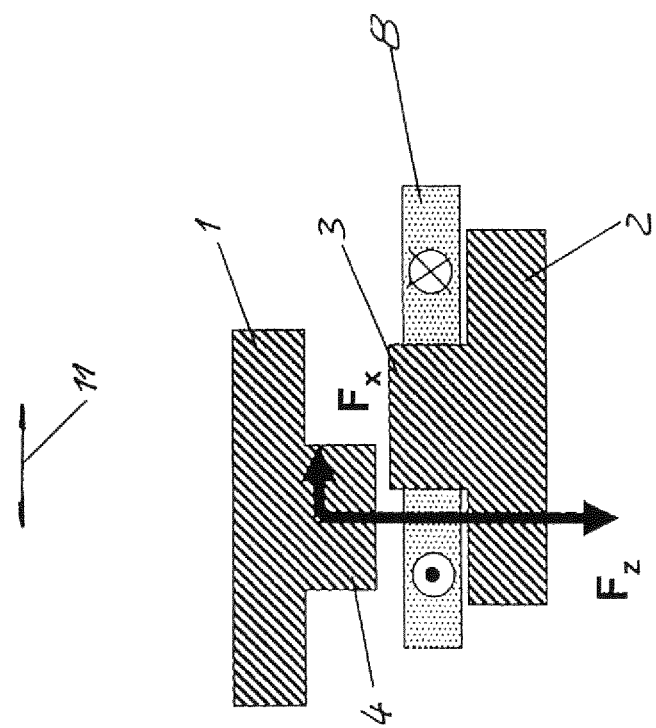
Figure 6:
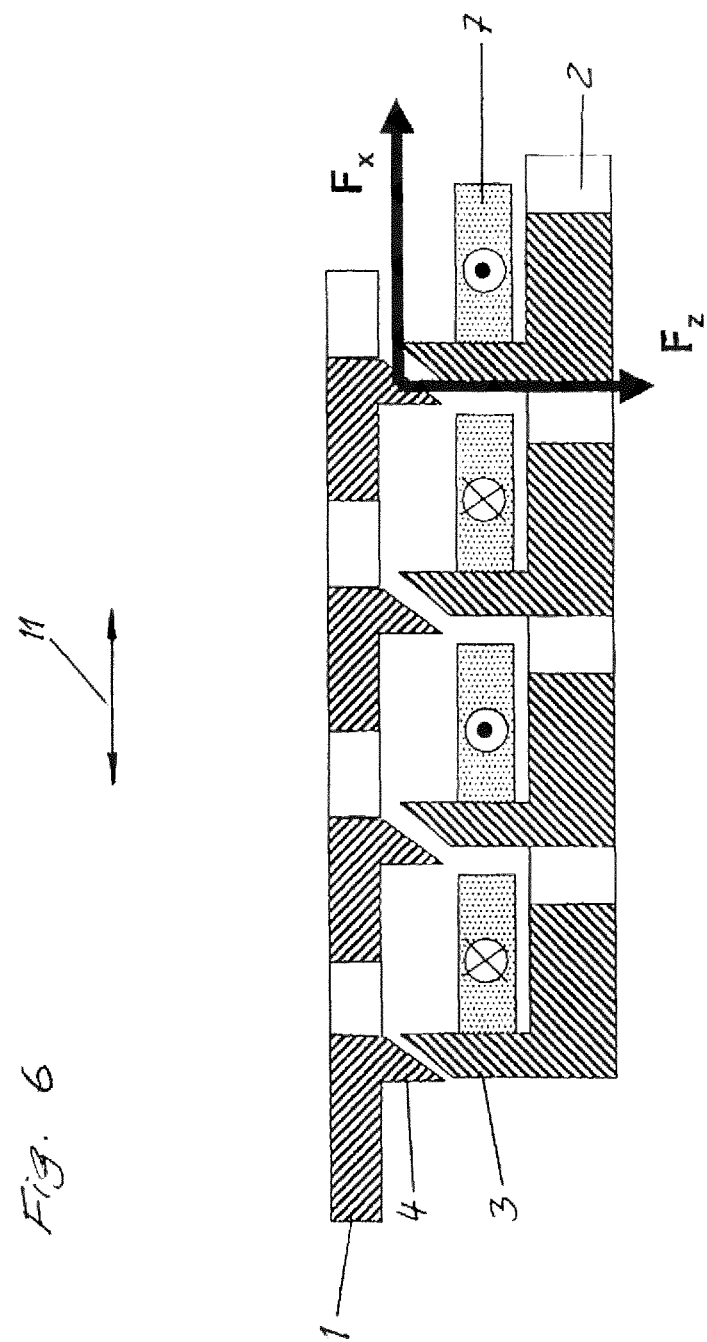
Figure 7:
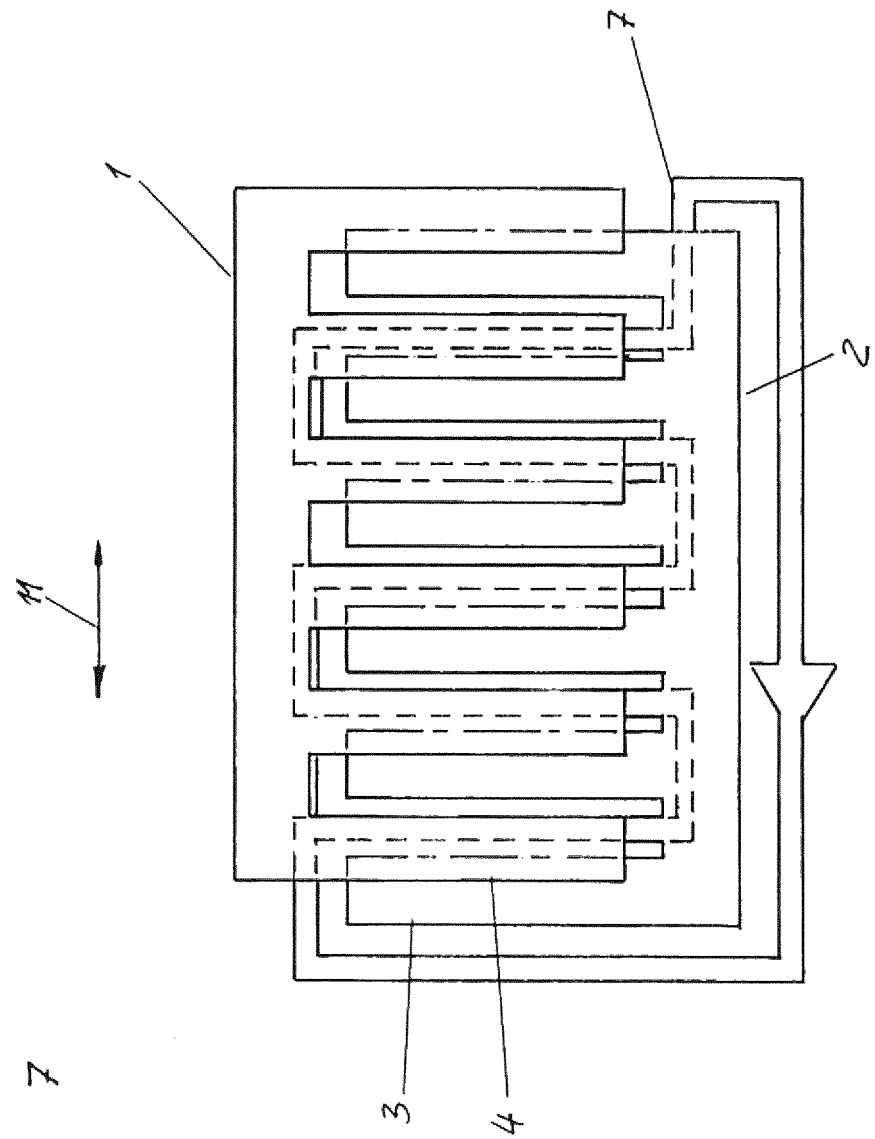

Exemplary embodiments of the invention are illustrated in the following drawings and will be explained in greater detail in the text which follows. In the drawings:

FIG. 1 shows a longitudinal section through a first exemplary embodiment of an operator control device in accordance with one embodiment of the disclosed subject matter, FIG. 2 shows a longitudinal section through a first and a second pole shoes of the operator control device according to FIG. 1 with the magnetic flux being guided in accordance with one embodiment of the disclosed subject matter, FIG. 3 shows a longitudinal section through a second exemplary embodiment of an operator control device in accordance with one embodiment of the disclosed subject matter, FIG. 4 shows a longitudinal section through a first and a second pole shoe of the operator control device according to FIG. 3 with the magnetic flux being guided in accordance with one embodiment of the disclosed subject matter, FIG. 5 shows a longitudinal section through a third exemplary embodiment of an operator control device in accordance with one embodiment of the disclosed subject matter, FIG. 6 shows a longitudinal section through a fourth exemplary embodiment of an operator control device in accordance with one embodiment of the disclosed subject matter, FIG. 7 shows a plan view of the flat components with pole shoes of the operator control device according to FIG. 6 in accordance with one embodiment of the disclosed subject matter, and FIG. 8 shows a longitudinal section through a fifth exemplary embodiment of an operator control device in accordance with one embodiment of the disclosed subject matter.

DETAILED DESCRIPTION OF THE PREFERRED EMBODIMENTS

The illustrated operator control devices have a first flat component 1 and a second flat component 2, which is arranged at a distance from and parallel to the first flat component.

The two flat components 1 and 2 are composed of a ferromagnetic material.

The second flat component 2 is arranged in a stationary manner, whereas the first flat component 1 is guided such that it can be moved between an inoperative position and a displacement position parallel to the second flat component 2.

The second flat component 2 has one first pole shoe 3 (FIG. 5) or a plurality of first pole shoes 3 (FIGS. 1-4 and 6-8) which is/are directed out of the plane of the second flat component 2 at a right angle to the first flat component 1.

The first flat component 1 has, corresponding to the first pole shoes 3, one second pole shoe 4 (FIG. 5) or a plurality of second pole shoes 4 (FIGS. 1-4 and 6-8) which is/are directed out of the plane of the first flat component 1 at a right angle to the second flat component 2.

The second pole shoes 4 have a greater lateral offset in relation to the first pole shoes 3 in the inoperative position than in the displacement position.

In FIG. 1, a touch-sensitive operator control area 5 is arranged on that side of the first flat component 1 which faces away from the second flat component 2, a signal being generated when said operator control area is touched by an input element, such as a finger 6 for example, and said signal leading to current being applied to an electrical conductor 7 which is associated with the first pole shoes 3 (FIGS. 1-4 and 6-8) or to an annular coil 8 (FIG. 5).

The touch-sensitive operator control area 5 is not illustrated, but is present, in the further figures.

A magnetic field is generated by current being applied to the conductor 7 or to the coil 8, the magnetic flux 9 of said magnetic field flowing through the second pole shoes 4 to the first pole shoes 3 and exerting a force, which is attractive to the first pole shoes 3, on the second pole shoes 4.

On account of the horizontal component $F_x$ of this force, the first flat component 1 of the exemplary embodiments of FIGS. 1-7 is moved out of its inoperative position to its displacement position against the force of a tension spring 10. The flux guidance, which occurs in this case, of the magnetic flux 9 between the first and the second pole shoe 3 and 4 is illustrated in FIG. 2.

The pre-stressed tension spring 10 which extends in the direction of extent of the first flat component 1 is fixedly arranged by way of its one end and engages on the first flat component 1 by way of its other end.

By alternately applying current and not applying current, the first component 1 and, with it, the operator control area 5 are moved in an alternating manner, this being perceived in a haptic manner by the operator through, e.g., his/her finger 6.

There is an axial distance between the free ends of the first and the second pole shoes 3 and 4, and therefore the second pole shoes 4 can move out of the inoperative position, which is laterally offset in relation to the first pole shoes 3, to the displacement position when current is applied to the electrical conductor 7, the end faces of the first and the second pole shoes 3 and 4 being situated at least substantially opposite in said displacement position.

The design of the operator control device of FIGS. 3 and 4 corresponds largely to the design of the operator control device of FIGS. 1 and 2, wherein the operator control area and the tension spring 10 are not illustrated.

In contrast to FIGS. 1 and 2, the pole shoes 3 and 4 extend to such an extent that they are situated opposite to one another by way of a portion of their length in the direction 11 of movement of the first flat component 1.

When current is applied to the electrical conductor 7, the second pole shoes 4 and, with them, the first flat component 1 are moved out of the inoperative position, which is laterally offset in relation to the first pole shoes 3, to the displacement position in which the second pole shoes 4 are located close to the first pole shoes 3 but without touching them.

The flux guidance, which occurs in this case, of the magnetic flux 9 between the first and the second pole shoes 3 and 4 is illustrated in FIG. 4.

The exemplary embodiment of FIG. 5 has in each case only one first and one second pole shoe 3 and 4, each being arranged centrally with respect to the length of the first and the second flat component 1 and 2 in the direction 11 of movement. In this case, the first pole shoe 3 is surrounded by an annular coil 8. The function each component largely corresponds to the function of the components shown in exemplary embodiment of FIGS. 1 and 2.

The exemplary embodiment of FIGS. 6 and 7 corresponds largely to the exemplary embodiment of FIGS. 1 and 2, with the difference that the end faces of the pole shoes 3 and 4, which end faces are situated opposite one another, do not extend parallel to the planes of the first and the second flat component 1 and 2, but rather extend in an inclined manner in the direction of movement of the first flat component 1.

As shown in FIG. 7, the first pole shoes 3 are designed in the manner of a comb with a connecting element which extends in the direction 11 of movement and connects the one ends of the first pole shoes 3 to one another, wherein the connecting element forms the second flat component 2.

Accordingly, the second pole shoes 4 are designed with a connecting element which extends in the direction 11 of movement and connects the one ends of the second pole shoes 4 to one another, wherein the connecting element forms the first flat component 1.

In this case (FIG. 7), the electrical conductor 7 is guided in a meandering manner through the interspaces between the first pole shoes 3.

The design of the first and the second flat components 1 and 2 and of the first and the second pole shoes 3 and 4, and also of the electrical conductor 7 of the exemplary embodiments of FIGS. 1-4, corresponds to the design which is illustrated in FIG. 7.

In the exemplary embodiment of FIG. 8, the first flat component 1 has a plurality of pairs of second pole shoes 12 which are arranged at a distance from one another in the direction 11 of movement, and the second flat component 2 has a plurality of pairs of first pole shoes 13 which are arranged at a distance from one another in the direction 11 of movement.

The pairs of first and second pole shoes 13 and 12 are designed in the manner of a comb so as to correspond to FIG. 7, and a first electrical conductor 14 and also a second electrical conductor 15 are guided in a meandering manner through the interspaces between the pairs of first pole shoes 13.

The pairs of second pole shoes 12 project into the interspaces between the pairs of first pole shoes 13, wherein the extent of the pairs of second pole shoes 12 in the direction 11 of movement is shorter than the distance between the pairs of first pole shoes 13.

By alternately applying current to the first and the second electrical conductor 14 and 15, magnetic fields by which pairs of second pole shoes 12 are moved alternately to the right to the inoperative position and to the left to the displacement position in the direction 11 of movement are alternately generated.

What is claimed is:

1. An operator control device having an operating element with haptic feedback, the operating element having a touch-sensitive operator control area and being operated by an operator through an input element, the operator control device comprising:

a first flat component and a stationary second flat component each of which being composed of a ferromagnetic material and arranged to face each other in parallel, wherein the first flat component is drivable to be displaced horizontally with respect to the stationary second flat component, and wherein the first flat component forms an operator control element or transmits movement of the first flat component entirely or partially to the operator control element; and a coil or an electrical conductor arranged between the first and second flat components and associated with a first pole shoe connected to the second flat component and projects in relation to the first flat component, wherein a magnetic field is generated by applying current to the coil or to the electrical conductor, wherein the first flat component is driven by the magnetic field to horizontally displace the first flat component with respect to the stationary second flat component from an inoperative position to a displacement position, wherein the first flat component is connected to a second pole shoe that projects toward the second flat component, and wherein the second pole shoe is laterally offset in relation to the first pole shoe in the direction of extent of the first and second flat components in the inoperative position of the first flat component.

2. The operator control device of claim 1, wherein a plurality of first pole shoes are connected to the second flat component, and wherein each of the plurality of first pole shoes is associated with an electrical conductor and corresponding second pole shoes, each of which are connected to the first flat component.

3. The operator control device of claim 1, wherein a free end of the first pole shoe is separated by an axial distance from a free end of the second pole shoe.

4. The operator control device of claim 1, wherein an end face of the first pole shoe faces an end face of the second pole shoe, wherein in the inoperative position of the first flat component the end faces of the first and second pole shoes do not overlap, or overlap by less than half of their respective extents in a direction of movement of the first flat component, and, in the displacement position of the first component, overlap to a greater extent than in the inoperative position of the first flat component.

5. The operator control device of claim 1, wherein the first pole shoe projects by such an extent in relation to the first flat component and the second pole shoe projects by such an extent from the second flat component that the free end regions of the first pole shoe and of the second pole shoe are situated opposite to each other and spaced apart at a distance in a direction of movement of the first flat component.

6. The operator control device of claim 1, wherein end faces of the first and second pole shoes, which end faces are situated opposite to each other, extend parallel in relation to each other.

7. The operator control device of claim 1, wherein end faces of the first and second pole shoes, which end faces are situated opposite to each other, extend parallel to planes of the first and the second flat components.

8. The operator control device of claim 1, wherein end faces of the first and second pole shoes, which end faces are situated opposite to each other, extend in an inclined manner in relation to planes of the first and the second flat components.

9. The operator control device of claim 1, wherein the first flat component is drivable against a spring force to be displaced horizontally with respect to the stationary second flat component from the inoperative position to the displacement position.

10. The operator control device of claim 1, wherein a pair of first pole shoes are arranged at a distance from each other in a direction of movement of the first flat component, and a second pole shoe, or a pair of second pole shoes, project between said first pole shoes, wherein the second pole shoe, or the pair of second pole shoes, are arranged between the pair of first pole shoes such that the second pole shoes are movable between the inoperative position and the displacement position, and wherein two coils or electrical conductors to which current can be alternately applied are associated with each first pole shoe of the pair of first pole shoes.

11. The operator control device of claim 1, wherein the coil surrounds the first pole shoe.

12. The operator control device of claim 1, wherein the first and the second pole shoes extend transverse to a direction of movement of the first flat component and parallel to the first flat component, and wherein the electrical conductor is guided along a longitudinal extent of the first pole shoe.

13. The operator control device of claim 12, wherein a plurality of first pole shoes are arranged in the manner of a comb with a connecting element extending in the direction of movement of the first flat component and connecting ends of the first pole shoes to one another, wherein the electrical conductor extends in a meandering manner through interspaces between the first pole shoes, wherein a corresponding number of second pole shoes are associated with the first pole shoes, and wherein the second pole shoes are arranged in the manner of a comb with a connecting element extending in the direction of movement of the first flat component and connecting ends of the second pole shoes to one another.

* * * * *